(12) United States Patent
Kocabas et al.

(10) Patent No.: US 12,541,860 B2
(45) Date of Patent: Feb. 3, 2026

(54) CAMERA AND ARTICULATED OBJECT MOTION ESTIMATION FROM VIDEO

(71) Applicant: NVIDIA Corporation, Santa Clara, CA (US)

(72) Inventors: Muhammed Kocabas, Tuebeingen (DE); Ye Yuan, State College, PA (US); Umar Iqbal, Fremont, CA (US); Pavlo Molchanov, Mountain View, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 299 days.

(21) Appl. No.: 18/135,654

(22) Filed: Apr. 17, 2023

(65) Prior Publication Data

US 2024/0070874 A1    Feb. 29, 2024

Related U.S. Application Data

(60) Provisional application No. 63/400,671, filed on Aug. 24, 2022.

(51) Int. Cl.
G06K 9/00 (2022.01)
G06T 7/20 (2017.01)
G06T 7/70 (2017.01)

(52) U.S. Cl.
CPC ............ *G06T 7/20* (2013.01); *G06T 7/70* (2017.01); *G06T 2207/20084* (2013.01); *G06T 2207/30196* (2013.01); *G06T 2207/30252* (2013.01); *G06T 2210/12* (2013.01)

(58) Field of Classification Search
CPC . G06T 2207/20084; G06T 2207/30196; G06T 2207/30244; G06T 2207/30252; G06T 2210/12; G06T 7/20; G06T 7/70
See application file for complete search history.

(56) References Cited

U.S. PATENT DOCUMENTS

| | | | | |
|---|---|---|---|---|
| 11,164,321 | B2 * | 11/2021 | Hsu | G06T 17/20 |
| 11,403,513 | B2 * | 8/2022 | Hasenclever | G06N 3/084 |
| 11,763,466 | B2 * | 9/2023 | Schmid | G06T 7/70 |
| | | | | 382/156 |
| 12,045,995 | B2 * | 7/2024 | Brizzi | G06T 7/277 |
| 2016/0239711 | A1 * | 8/2016 | Gong | G06V 40/173 |
| 2019/0087975 | A1 * | 3/2019 | Versace | G06N 3/049 |
| 2020/0211206 | A1 * | 7/2020 | Wang | G06N 3/08 |

(Continued)

OTHER PUBLICATIONS

Henning, Dorian F., Tristan Laidlow, and Stefan Leutenegger. "BodySLAM: joint camera localisation, mapping, and human motion tracking." European Conference on Computer Vision. Cham: Springer Nature Switzerland, 2022. (Year: 2022).*

(Continued)

*Primary Examiner* — Hadi Akhavannik
(74) *Attorney, Agent, or Firm* — Zilka-Kotab, P.C.

(57) ABSTRACT

Estimating motion of a human or other object in video is a common computer task with applications in robotics, sports, mixed reality, etc. However, motion estimation becomes difficult when the camera capturing the video is moving, because the observed object and camera motions are entangled. The present disclosure provides for joint estimation of the motion of a camera and the motion of articulated objects captured in video by the camera.

23 Claims, 10 Drawing Sheets

(56) References Cited

U.S. PATENT DOCUMENTS

2020/0363815 A1* 11/2020 Mousavian ............... G06T 7/75
2021/0150736 A1* 5/2021 Lv ............................ G06T 7/11

OTHER PUBLICATIONS

Dai, Angela, et al. "Bundlefusion: Real-time globally consistent 3d reconstruction using on-the-fly surface reintegration." ACM Transactions on Graphics (ToG) 36.4 (2017): 1. (Year: 2017).*

Kaess, Michael, Ananth Ranganathan, and Frank Dellaert. "iSAM: Incremental smoothing and mapping." IEEE Transactions on Robotics 24.6 (2008): 1365-1378. (Year: 2008).*

Isam (Year: 2008).*

BundleFusion: (Year: 2017).*

Bodyslam (Year: 2022).*

Kocabas et al., "VIBE: Video Inference for Human Body Pose and Shape Estimation," CVPR, 2020, 12 pages, retrieved from https://arxiv.org/abs/1912.05656.

Iqbal et al., "KAMA: 3D Keypoint Aware Body Mesh Articulation," International Conference on 3D Vision (3DV), Apr. 2021, 11 pages, retrieved from https://www.semanticscholar.org/paper/KAMA%3A-3D-Keypoint-Aware-Body-Mesh-Articulation-Iqbal-Xie/3627616a92134ba74600eb576718efe744c486f6.

Kocabas et al., "PARE: Part Attention Regressor for 3D Human Body Estimation," ICCV, 2021, pp. 11127-11137, retrieved from https://openaccess.thecvf.com/content/ICCV2021/papers/Kocabas_PARE_Part_Attention_Regressor_for_3D_Human_Body_Estimation_ICCV_2021_paper.pdf.

Teed et al., "DROID-SLAM: Deep Visual SLAM for Monocular, Stereo, and RGB-D Cameras," 35th Conference on Neural Information Processing Systems (NeurIPS 2021), 2021, 12 pages.

Schonberger, J., "Robust Methods for Accurate and Efficient 3D Modeling from Unstructured Imagery," Thesis, ETH Zürich, 2018, 291 pages.

Yuan et al., "GLAMR: Global Occlusion-Aware Human Mesh Recovery with Dynamic Cameras," CVPR, 2022, pp. 11038-11049, retrieved from https://openaccess.thecvf.com/content/CVPR2022/papers/Yuan_GLAMR_Global_Occlusion-Aware_Human_Mesh_Recovery_With_Dynamic_Cameras_CVPR_2022_paper.pdf.

Henning et al., "BodySLAM: Joint Camera Localisation, Mapping, and Human Motion Tracking," ECCV, 2022, 24 pages, retrieved from https://arxiv.org/abs/2205.02301.

Mahmood et al., "AMASS: Archive of Motion Capture as Surface Shapes," arXiv, 2019, 12 pages, retrieved from https://arxiv.org/abs/1904.03278.

Akhter et al., "Pose-Conditioned Joint Angle Limits for 3D Human Pose Reconstruction," CVPR, 2015, pp. 1446-1455.

Belagiannis et al., "3D Pictorial Structures for Multiple Human Pose Estimation," CVPR, 2014, 8 pages, retrieved from http://campar.in.tum.de/pub/belagiannis2014cvpr/belagiannis2014cvpr.pdf.

Dabral et al., "Gravity-Aware Monocular 3D Human-Object Reconstruction," ICCV, 2021, pp. 12365-12374.

Dong et al., "Shape-aware Multi-Person Pose Estimation from Multi-View Images," ICCV, 2021, pp. 11158-11168.

Fabbri et al., "Compressed Volumetric Heatmaps for Multi-Person 3D Pose Estimation," CVPR, 2020, pp. 7204-7213.

Guzov et al., "Human POSEitioning System (HPS): 3D Human Pose Estimation and Self-localization in Large Scenes from Body-Mounted Sensors," CVPR, 2021, pp. 4318-4329.

Hasler et al., "Markerless Motion Capture with Unsynchronized Moving Cameras," IEEE Conference on Computer Vision and Pattern Recognition, 2009, 8 pages, retrieved from https://www.semanticscholar.org/paper/Markerless-Motion-Capture-with-unsynchronized-Hasler-Rosenhahn/5c4d3c8a9da9add969dbd9def04c59c4d34518c0.

Hassan et al., "Resolving 3D Human Pose Ambiguities with 3D Scene Constraints," ICCV, 2019, pp. 2282-2292, retrieved from https://openaccess.thecvf.com/content_ICCV_2019/papers/Hassan_Resolving_3D_Human_Pose_Ambiguities_With_3D_Scene_Constraints_ICCV_2019_paper.pdf.

He et al., "NeMF: Neural Motion Fields for Kinematic Animation," 36th Conference on Neural Information Processing Systems (NeurIPS 2022), 2022, pp. 1-13.

Iqbal et al., "Weakly-Supervised 3D Human Pose Learning via Multi-view Images in the Wild," CVPR, 2020, pp. 5243-5252.

Jiang et al., "Coherent Reconstruction of Multiple Humans from a Single Image," CVPR, 2020, pp. 82-91.

Kocabas et al., "SPEC: Seeing People in the Wild with an Estimated Camera," ICCV, 2021, pp. 11035-11045, retrieved from https://openaccess.thecvf.com/content/ICCV2021/papers/Kocabas_SPEC_Seeing_People_in_the_Wild_With_an_Estimated_Camera_ICCV_2021_paper.pdf.

Li et al., "D&D: Learning Human Dynamics from Dynamic Camera," ECCV, 2022, 18 pages, retrieved from https://www.ecva.net/papers/eccv_2022/papers_ECCV/papers/136650470.pdf.

Li et al., "HybrIK: A Hybrid Analytical-Neural Inverse Kinematics Solution for 3D Human Pose and Shape Estimation," CVPR, 2021, 14 pages, retrieved from https://arxiv.org/abs/2011.14672.

Liu et al., "4D Human Body Capture from Egocentric Video via 3D Scene Grounding," International Conference on 3D Vision (3DV), 2021, 10 pages, retrieved from https://www.semanticscholar.org/paper/4D-Human-Body-Capture-from-Egocentric-Video-via-3D-Liu-Yang/14753b5266f5607d145166c37cdea037c62f2f48.

Loper et al., "SMPL: A Skinned Multi-Person Linear Model," ACM Transactions on Graphics, vol. 34, Nov. 2015, 16 pages, retrieved from https://www.researchgate.net/publication/287815055_SMPL_a_skinned_multi-person_linear_model.

Mehta et al., "Monocular 3D Human Pose Estimation in The Wild Using Improved CNN Supervision," International Conference on 3D Vision, 2017, 16 pages, retrieved from https://vcai.mpi-inf.mpg.de/3dhp-dataset/.

Rempe et al., "HuMoR: 3D Human Motion Model for Robust Pose Estimation," ICCV, 2021, 25 pages, retrieved from https://geometry.stanford.edu/projects/humor/.

Sohl-Dickstein et al., "Deep Unsupervised Learning using Nonequilibrium Thermodynamics," Proceedings of the 32nd International Conference on Machine Learning, vol. 37, 2015, 10 pages.

Weng et al., "Holistic 3D Human and Scene Mesh Estimation from Single View Images," CVPR, 2021, pp. 334-343.

Ye et al., "Decoupling Human and Camera Motion from Videos in the Wild," CVPR, 2023, pp. 21222-21232, retrieved from https://openaccess.thecvf.com/content/CVPR2023/papers/Ye_Decoupling_Human_and_Camera_Motion_From_Videos_in_the_Wild_CVPR_2023_paper.pdf.

Zhang et al., "ByteTrack: Multi-Object Tracking by Associating Every Detection Box," ECCV, 2022, 19 pages, retrieved from https://www.ecva.net/papers/eccv_2022/papers_ECCV/papers/136820001.pdf.

* cited by examiner

CAMERA AND ARTICULATED OBJECT MOTION ESTIMATION FROM VIDEO

RELATED APPLICATION(S)

This application claims the benefit of U.S. Provisional Application No. 63/400,671, titled "JOINT HUMAN AND CAMERA MOTION ESTIMATION FROM VIDEOS WITH DYNAMIC CAMERAS" and filed Aug. 24, 2022, the entire contents of which is incorporated herein by reference.

TECHNICAL FIELD

The present disclosure relates to estimating motion from video captured by a moving camera.

BACKGROUND

Estimating motion of a human or other object in video is a common computer task with applications in robotics, sports, mixed reality, etc. While many solutions exist to estimate the motion of articulated objects in video captured by a static camera, motion estimation becomes more difficult when the camera is moving. This difficulty arises because the observed object and camera motions are entangled.

In particular, estimating human motion by itself from videos is highly under-constrained since subject and camera motion are interchangeable. Analogously, camera motion estimation is more challenging in dynamic scenes due to spurious correspondences. There are few current solutions to this problem of estimating motion from video captured by a dynamic camera, and even still these solutions exhibit various limitations. Primarily, current solutions fail to decouple the motion of articulated objects captured in video by a moving camera and motion of the moving camera itself.

There is a need for addressing these issues and/or other issues associated with the prior art. For example, there is a need for jointly estimating motion of a camera and motion of articulated objects captured in video by the camera.

SUMMARY

A method, computer readable medium, and system are disclosed for jointly estimating motion of a camera and motion of articulated objects captured in video by the camera.

DETAILED DESCRIPTION

Figure 1:
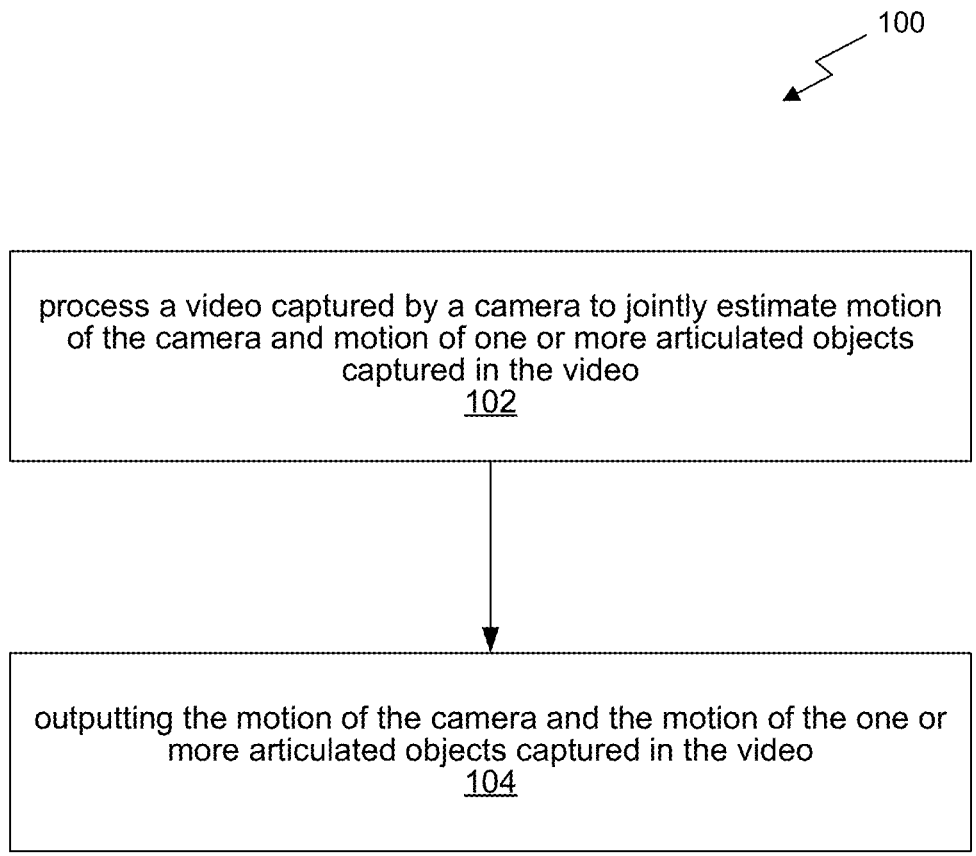
FIG. 1 illustrates a method for jointly estimating motion of a camera and motion of articulated objects captured in video by the camera, in accordance with an embodiment.

FIG. 1 illustrates a method 100 for jointly estimating motion of a camera and motion of articulated objects captured in video by the camera, in accordance with an embodiment. The method 100 may be performed by a device, which may be comprised of a processing unit, a program, custom circuitry, or a combination thereof, in an embodiment. In another embodiment a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100.

In operation 102, a video captured by a camera is processed to jointly estimate motion of the camera and motion of one or more articulated objects captured in the video. With respect to the present description, the camera is dynamic, or in other words is capable of being in motion. Accordingly, with respect to the present method 100, the camera is in motion while capturing at least a portion of the video, in other words the video is captured by a moving camera.

As mentioned, the video captures one or more articulated objects. With respect to the present description, an articulated object is any physical object having one or more parts that are articulated that is capable of being in motion. Just by way of example, each articulated object may include a human. Accordingly, with respect to the present method 100, at least a portion of the video captures the articulated object(s) in motion. Thus, the articulated object(s) may those that are visible in the video.

Since the motion of the camera and the motion of the articulated object(s) are entangled in the video, the motion of the camera and the motion of the articulated object(s) are jointly estimated. In an embodiment, the motion of the camera and the motion of the articulated object(s) are estimated in a global world coordinate system, and thus in a coherent global space. In an embodiment, the video may be processed using a neural network to make the joint estimation. The neural network may be recurrent neural network, in an embodiment.

In an embodiment, the motion of the camera may be defined over each of a plurality of timesteps in the video. The plurality of timesteps may be all timesteps in the video or a subset of timesteps in the video. In an embodiment, the motion of the camera includes, for each of the plurality of timesteps in the video, camera rotation and camera translation. In an embodiment, the motion of the camera may be represented as a trajectory of the camera.

In an embodiment, the motion of the articulated object(s) may be defined over each of a plurality of timesteps in the video (i.e. the same timesteps over which the motion of the camera is defined). In an embodiment, the motion of the articulated object(s) includes, for each of the articulated object(s) and for each of the timesteps, global translation, global orientation, and object pose parameters. Further to this embodiment, the motion of the articulated object(s) includes, for each of the articulated object(s) and for the plurality of timesteps in the video, object shape parameters. Thus, while some information defining the motion of the articulated object(s) may be defined over each timestep (e.g. global translation, global orientation, and object pose parameters), other information defining the motion of the articulated object(s) may be defined once for all timesteps (e.g. object shape parameters).

In an embodiment, processing the video to jointly estimate the motion of the camera and the motion of the articulated object(s) captured in the video may include obtaining bounding box sequences for visible articulated objects in the video. In an embodiment, processing the video to jointly estimate the motion of the camera and the motion of the one or more articulated object(s) captured in the video may further include estimating object pose information for each detected bounding box. In an embodiment, the object pose information may be provided in a camera coordinate frame.

In an embodiment, a subset of the object pose information may be agnostic to camera motion. This camera motion-agnostic subset of the object pose information may include object pose parameters and object shape parameters. In an embodiment, the object shape parameters may be determined as an average of per-frame object shape parameter estimates.

In another embodiment, a subset of the object pose information may be dependent on camera motion. This camera motion-dependent subset of the object pose information may include global translation and global orientation. In an embodiment, the global orientation may be determined by determining a per-frame camera-to-world transform, wherein the per-frame camera-to-world transform includes at least camera rotation information, and further estimating the global orientation from the camera rotation information. In an embodiment, the per-frame camera-to-world transform may be determined using information of a static scene. In yet another embodiment, the global translation may be estimated from the global orientation and object pose parameters using the neural network mentioned above.

In still yet a further embodiment, processing the video captured by the camera may also include refining the motion of the camera and the motion of the articulated object(s) captured in the video. Various optimization functions may be used to refine (e.g. optimize) the estimated camera and articulated object(s) motion. In an embodiment, supervised gradient descent may be used to refine the estimated motion of the camera and the articulated object(s). In an embodiment, a global optimization may be performed. In an embodiment, the scale of camera trajectory may be estimated and then the motion of the camera and the motion of the articulated object(s) may be refined. In an embodiment, the refining may be based on human motion priors. In yet another embodiment, the refining may be based on background scene features.

In an embodiment, an entirety of the video may be divided into sub-clips and all clips may be optimized in parallel for faster optimization. In another embodiment, a runtime of the processing may grow sublinearly with respect to a sequence length of the video.

In operation 104, the motion of the camera and the motion of the one or more articulated objects captured in the video are output. In other words, the camera and articulated object motion resulting from operation 102 is output. In an embodiment, the initial estimated camera and articulated object motion may be output. In another embodiment, the refined camera and articulated object motion may be output.

The camera and articulated object motion may be output for any desired purpose. In one embodiment, the camera and articulated object motion may be output to a downstream task (e.g. that uses the camera and articulated object motion as input for performing some further processing task). The downstream task may include a robotics-related task, for example. As another example, the downstream task may include a mixed reality-related task.

To this end, the present method 100 allows for the motion of a camera and the motion of an articulated object captured in video by the camera, which are entangled in the video, to be jointly estimated. This joint estimation allows for the camera motion to be considered when determining the articulated object motion and vice versa. For example, by considering the camera motion when determining the articulated object motion, the method 100 may disentangle the articulated object motion from the camera motion and thus a more accurate estimation of the actual motion of the articulated object itself may be made.

In one exemplary implementation, the method 100 may be used in the context of an autonomous driving vehicle. In this exemplary implementation, a video is captured during movement of an autonomous driving vehicle, using a camera connected to the autonomous driving vehicle, where the video is of an environment of the autonomous driving vehicle that includes a human in motion. The video is processed to jointly estimate a trajectory of the camera (e.g. and thus a trajectory of the autonomous driving vehicle) and a trajectory of the human captured in the video. The trajectory of the camera and the trajectory of the human captured in the video are then used to make an autonomous driving decision for the autonomous driving vehicle. In an embodiment of this exemplary implementation, the trajectory of the camera and the trajectory of the human captured in the video may be used to detect a future collision of the autonomous driving vehicle and the human, and in turn the future collision may be the basis for making the autonomous driving decision. For example, the autonomous driving decision may include changing a trajectory of the autonomous driving vehicle to prevent the future collision.

In various embodiments of this exemplary implementation, the human may be walking within the environment, running within the environment, riding a bicycle within the environment, pushing a stroller within the environment, etc. In another possible embodiment, the trajectory of the camera and the trajectory of the human captured in the video may be used to understand an intent of the human and/or an activity that the human is engaged in, which may then optionally be used as a basis for making the autonomous driving decision or may be used as the basis for any other desired purpose without necessarily making an autonomous driving decision.

In another exemplary implementation, the method 100 may be used in the context of generating an animation. In this exemplary implementation, a video of an articulated object (e.g. human) in motion is captured using a moving camera. The video is processed to jointly estimate a motion of the camera and a motion of the articulated object captured in the video. The motion of the camera and the motion of the articulated object is then used to animate a virtual character in a three-dimensional (3D) environment. For example, the virtual character may be animated to mimic the motion of the articulated object, optionally from a moving perspective that also mimics the motion of the camera.

Further embodiments will now be provided in the description of the subsequent figures. It should be noted that the embodiments disclosed herein with reference to the method 100 of FIG. 1 may apply to and/or be used in combination with any of the embodiments of the remaining figures below.

Figure 2:
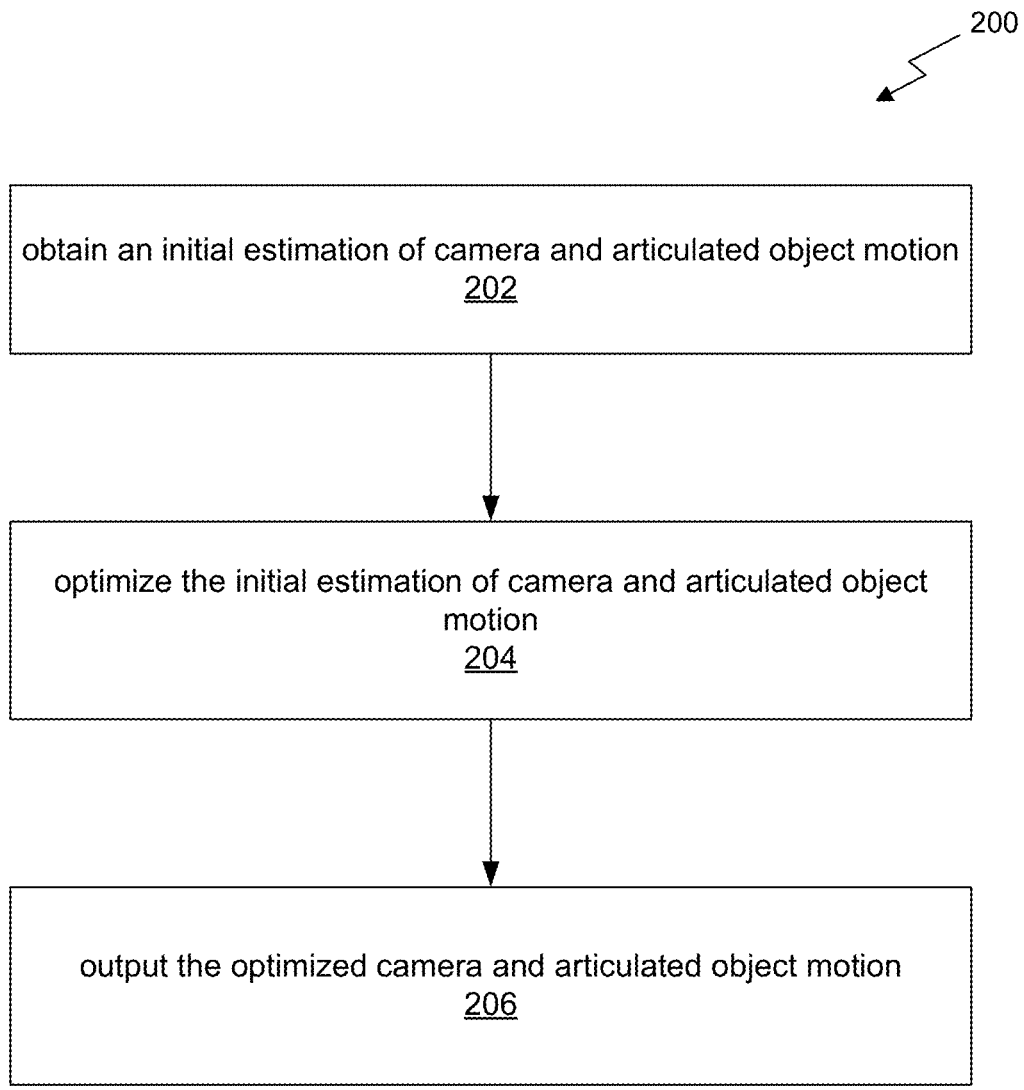
FIG. 2 illustrates a method for generating an optimized estimation of camera and articulated object motion, in accordance with an embodiment.

FIG. 2 illustrates a method 200 for generating an optimized estimation of camera and articulated object motion, in accordance with an embodiment. The method 200 may be performed in accordance with the method 100 of FIG. 1. Accordingly, the definitions and embodiments described above may equally apply to the description of the present embodiment.

In operation 202, an initial estimation of camera and articulated object motion is obtained. The initial estimation refers to the estimation of camera and articulated object motion that is computed prior to performing any optimization (i.e. refinement) of such estimation. One embodiment of computing such initial estimation of camera and articulated object motion will be described below with reference to FIG. 3.

In operation 204, the initial estimation of camera and articulated object motion is optimized. Optimizing the initial estimation of camera and articulated object motion refers to refining the initial estimates of the camera and articulated object motion, including to recover an accurate global trajectory of the camera. One or more defined optimization functions may be used to optimize the estimated camera and articulated object(s) motion. In an embodiment, the camera and articulated object motion may be jointly optimized using a bundle adjustment objective to match both observed object poses and background scene features. Multiple possible embodiments of such optimization functions will be described below with reference to FIGS. 4-6.

In operation 206, the optimized camera and articulated object motion is output. As described with respect to operation 104 of FIG. 1, the optimized camera and articulated object motion may be output to a downstream task, for example that uses the camera and articulated object motion as input for performing some further processing task such as robotics-related task, a mixed reality-related task, etc.

Figure 3:
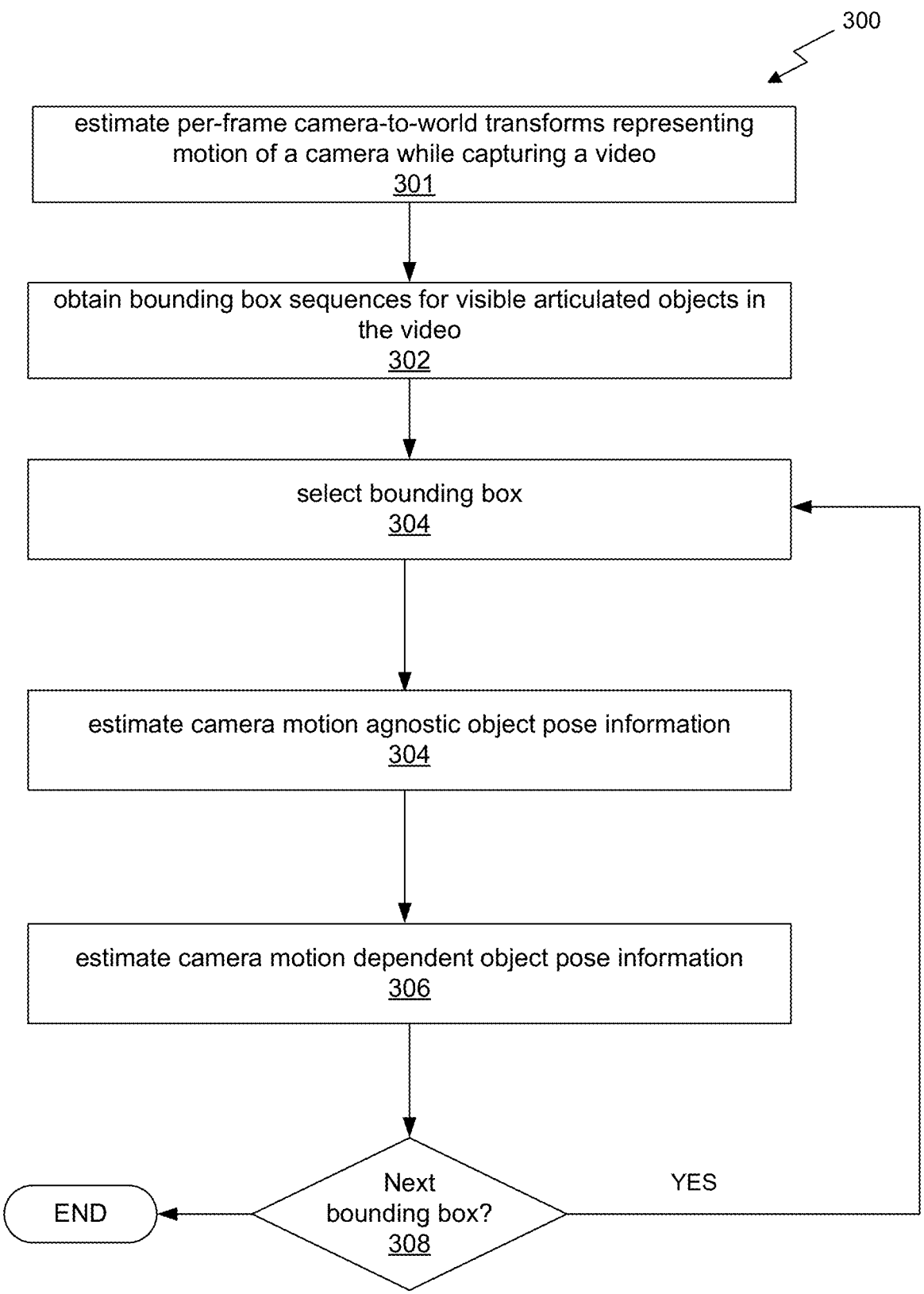
FIG. 3 illustrates a method for obtaining an initial estimation of camera and articulated object motion, in accordance with an embodiment.

FIG. 3 illustrates a method 300 for obtaining an initial estimation of camera and articulated object motion, in accordance with an embodiment. The method 300 may be performed to carry out operation 102 of FIG. 1 (in part) and/or operation 202 of FIG. 2, as described above, in an embodiment. Again, the definitions and embodiments described above may equally apply to the description of the present embodiment.

In operation 301, per-frame camera-to-world transforms are estimated. These per-frame camera-to-world transforms represent the motion of the camera while capturing a video. In an embodiment, the per-frame camera-to-world transforms include camera rotation and translation for every time step in the video. In an embodiment, the per-frame camera-to-world transforms are estimated using a data-driven simultaneous localization and mapping (SLAM) method, such as DROID-SLAM, which uses the information of the static scene to make the per-frame estimation. In an embodiment, the translation of the camera may be up to a scaling factor. In another embodiment, the scale of the camera translation may be recovered using the human body priors.

In operation 302, bounding box sequences for visible articulated objects in the video are obtained. The visible articulated objects refer to one or more articulated objects captured in the video that are visible within the video, or in other words that are not occluded by other objects or features of the scene captured in the video. A bounding box sequence refers to a sequence of bounding boxes computed for a particular articulated object over a plurality of timesteps (e.g. frames) in the video. A separate bounding box sequence may be computed for each visible articulated object in the video. In an embodiment, the bounding box sequences may be obtained using a multi-object tracking and re-identification algorithm.

In operation 304, a bounding box is selected from one of the bounding box sequences. During a first iteration of operation 304, the selected bounding box may be initial bounding box in one of the bounding box sequences.

In operation 306, camera motion agnostic object pose information is estimated. The camera motion agnostic object pose information refers to pose information for an articulated object (i.e. in the bounding box) that is agnostic to (i.e. not dependent on) motion of the camera used to capture the video.

In the present embodiment, the camera motion agnostic object pose information is a subset of all object pose information that is ultimately estimated. This camera motion agnostic object pose information may include object pose parameters and object shape parameters, as described in more detail below.

In operation 308, camera motion dependent object pose information is also estimated. The camera motion dependent object pose information refers to pose information for an articulated object (i.e. in the bounding box) that is dependent on the motion of the camera used to capture the video. Thus, the camera motion dependent object pose information is also a subset of all object pose information that is ultimately estimated. As mentioned in further description below, the camera motion dependent object pose information may include global translation and global orientation.

In decision 310, it is determined whether there is a next bounding box (i.e. to be selected for processing). If so, the method 300 returns to operation 304 to select the next bounding box. Otherwise, the method 300 ends. The following description provides a detailed embodiment of the present method 300.

The object pose information (including both the camera motion agnostic object pose information and the camera motion dependent object pose information) may be estimated using HybrIK. The object pose may be provided in a camera coordinate frame represented as $\hat{Q}_t^c = (\hat{\Phi}_t^c, \hat{\tau}_t^c, \hat{\theta}_t, \hat{\beta}_t)$. The super-script c corresponds to the camera coordinate frame. Note that the local body pose $\theta_t$ and shape $\beta_t$ are agnostic to camera motion. For videos recorded with dynamic cameras, the estimated translation $\hat{\tau}_t^c$ and root orientation $\hat{\Phi}_t^c$ must be transformed from camera coordinates to a consistent world coordinate frame. This requires knowledge of the per-frame camera-to-world transforms $\{R_t, T_t\}_{t=1}^T$. In an embodiment, a data-driven SLAM method may be used, such as DROID-SLAM, which uses the information of the static scene to estimate per-frame camera-to-world transforms $\{\hat{R}_t, \hat{T}_t\}_{t=1}^T$. SLAM methods, however, provide camera translations $\hat{T}_t$ up to scale. Hence, at this stage, the camera rotation information is used to obtain the root orientation of the articulated object in the world coordinate frame, per Equation 1.

$$\hat{\Phi}_t = \hat{R}_t^{-1} \hat{\Phi}_t^c \qquad \text{Equation 1}$$

A neural network is then used to estimate the initial global root translations $\{\hat{\tau}_t\}_{t=s}^e$ from the local pose parameters $\{\hat{\Phi}_t, \hat{\theta}_t\}_{t=s}^e$. A single value is used for shape parameters $\beta$ for each articulated object that is initialized with the average of the per-frame estimates from HybrIK $$\text{(i.e. } \hat{\beta} = \frac{\sum_{t=s}^{e} \hat{\beta}_t}{e-s}.$$

This forms the initial estimate of the global articulated object motion $\widehat{Q} = \{\widehat{Q}_t = (\hat{\Phi}_t, \hat{\tau}_t, \hat{\theta}_t, \hat{\beta})\}_{t=s}^{e}$ in the world coordinate frame.

Figure 4:
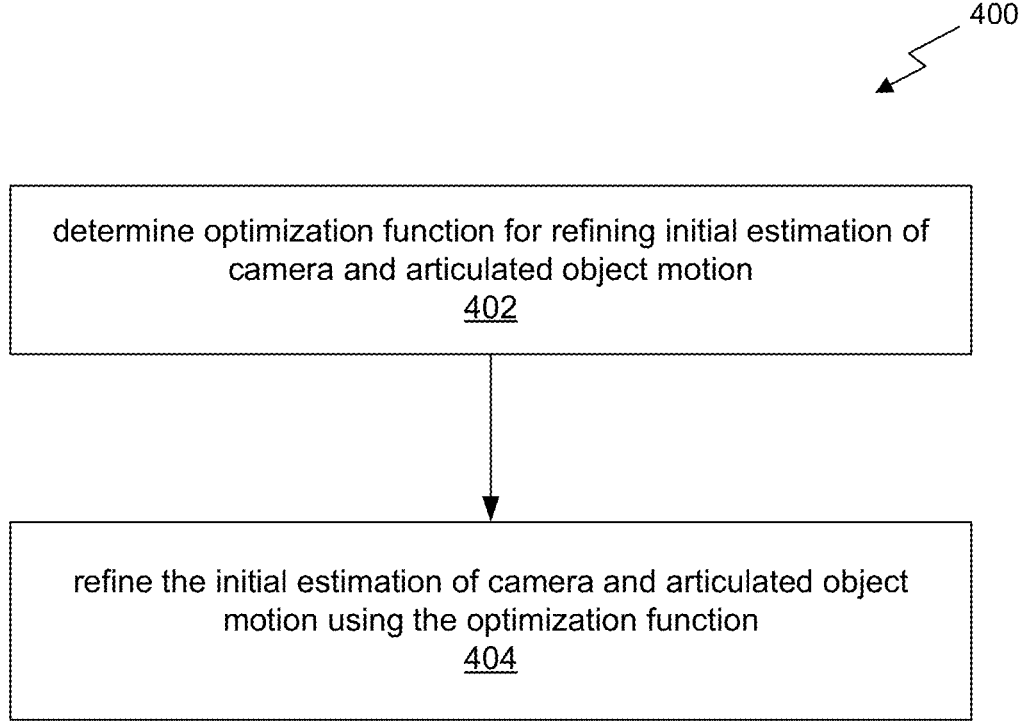
FIG. 4 illustrates a method for optimizing an initial estimation of camera and articulated object motion, in accordance with an embodiment.

FIG. 4 illustrates a method 400 for optimizing an initial estimation of camera and articulated object motion, in accordance with an embodiment. The method 400 may be performed to carry out operation 102 of FIG. 1 (in part) and/or operation 204 of FIG. 2, as described above, in an embodiment. Again, the definitions and embodiments described above may equally apply to the description of the present embodiment.

In operation 402, an optimization function for refining an initial estimation of camera and articulated object motion is determined. The optimization function may thus be predefined/preconfigured for use in refining the initial estimation of camera and articulated object motion. In operation 404, the initial estimation of camera and articulated object motion is refined using the optimization function. With respect to the present embodiment, the initial estimates may be refined via articulated object motion priors and the background scene features, while recovering accurate global camera trajectories.

Articulated Object Motion Prior

It should be noted that while the motion prior is referred to herein as a "human" motion prior (and likewise the articulated object referred to herein as being "human"), the description may equally apply to motion priors determined for any other type of articulated object.

A human motion prior may be developed that ensures that the estimated human motion is plausible and also helps constrain the solution space during joint optimization of human and camera motion. For this, a variational autoencoder (VAE) may be used which learns a latent representation z of human motion and regularizes the distribution of the latent code to be a normal distribution. The decoder $\mathcal{D}$ of the VAE has to be non-autoregressive for faster sampling while not sacrificing accuracy. This is important in order to use the motion prior in an iterative optimization, and auto-regressive motion priors (e.g. HuMoR) are prohibitively slow when processing large motion sequences. In contrast, a non-autoregressive decoder can be evaluated for the entire sequence in parallel. To this end, a Neural Motion Field (NeMF) based decoder is adopted to represent body motion as a continuous vector field of body poses via a NeRF-style multilayer perceptron (MLP). As described in further detail below, NeMF can be extended to a parallel motion prior that enables efficient optimization. Only the local body motion may be modeled via the prior. Specifically, $\widehat{Q}_t$ is an MLP that takes the latent codes $\{z_\Phi, z_\theta\}$ and a time step t as input and produces the orientation $\hat{\Phi}_t$, local body pose $\hat{\theta}_t$, and joint contacts $\hat{K}_t$ for a given time step, as illustrated in Equation 2.

$$\widehat{Q}_t : (t, z_\Phi, z_\theta) \rightarrow (\hat{\Phi}_t, \hat{\theta}_t, \hat{K}_t) \qquad \text{Equation 2}$$

where $z_\Phi$ and $z_\theta$ control the root orientation $\Phi$ and the local body pose $\theta$ of the person, respectively.

For a given pair of $z_\Phi$ and $z_\theta$ the entire sequence can be sampled in parallel by simply varying the values of t. To incorporate the motion priors during global optimization, the latent codes $\{z_\Phi, z_\theta\}$ are optimized instead of directly optimizing the local body motion $\{\Phi_t, \theta_t\}_{t=s}^{e}$. The latent codes are initialized using the pre-trained encoders of the VAE, namely $z_\Phi = \varepsilon_\Phi(\{\Phi\}_{t \rightarrow s}^{e})$ and $z_\Phi = \varepsilon_\theta(\{\theta\}_{t=s}^{e})$.

Global Translation Estimation

A fully convolutional network is used to generate the global translation $\tau_t^i$ of the root joint, based on the local joint positions, velocities, rotations, and angular velocities as inputs. All quantities can be computed from joint rotations. One approach takes into account the fact that the subject's global translation is conditioned on its local poses. In order to avoid any ambiguity in the output, the velocity $\dot{\tau}_t$ is predicted rather than $\tau_t$ directly, and then the velocity is integrated using the forward Euler method to obtain $\tau_{t+1} = \tau_t + \dot{\tau}_t \Delta t$. The height of the root joint is predicted using the same convolutional network to prevent any cumulative errors that could cause the subject to float above or sink into the ground.

Since changing the latent codes $\{z_\Phi, z_\theta\}$ also impacts the global translations $\tau_t$, for simplicity, we refer to the mapping from latent codes to global human motion as illustrated in Equation 3.

$$P : (t, z_\Phi, z_\theta) \rightarrow (\hat{\Phi}_t, \hat{\theta}_t, \hat{\tau}_t) \qquad \text{Equation 3}$$

Global Optimization

The present embodiment details a proposed optimization formulation for the joint reconstruction of global human and camera motion. The goal is to optimize the latent code $z = \{z_\Phi, z_\theta\}$ and camera-to-world transforms $\{R_t, sT_t\}$ with correct scale s. Note that SLAM methods assume the camera at the first frame (t=0) to be at the origin. To align all coordinate frames, the camera height $h_0$ and orientation $R_0$ are optimized for the first frame. More specifically, the objective function illustrated in Equation 4 is optimized.

$$\min_{\substack{\beta, z \\ s, h_0, R_0, \{R_t, T_t\}_{t=1}^T}} E_{body} + E_{scene} + E_{camera}, \qquad \text{Equation 4}$$

where $$E_{body} = E_{2D} + E_\beta + E_{pose} + E_{smooth}^b + E_{VAE} + E_{consist},$$

$$E_{scene} = E_{contact} + E_{height},$$

$$E_{camera} = E_{PCL} + E_{smooth}^e.$$

The error term $E_{body}$ ensures that the reconstructed human motion is plausible and agrees with the image evidence. $E_{2D}$ measures the 2D reprojection error between the estimated 3D motion and 2D body joints $x_t$ obtained using a state-of-the-art 2D joint detector, as illustrated in Equation 5.

$$E_{2D} = \sum_{i=1}^N \sum_{t=s_i}^{e_i} \omega_t \zeta \left( \prod \left( R_0 R_t J_t^i + sT_t + \begin{matrix} 0 \\ 0 \\ h_0 \end{matrix} - x_t^i \right) \right) \qquad \text{Equation 5}$$

Here $\omega_t$ are the body joint detection confidences, $\zeta$ is the robust Geman-McClure function, $\Pi$ corresponds to perspective projection using the known camera intrinsic matrix K, and $J_t^i$ corresponds to 3D body joints that are obtained from the SMPL body mesh via a pre-trained regressor W, per Equation 6.

$$J_t^i = W(M(P(z,t), \beta_t^i)) \qquad \text{Equation 6}$$

The error term $E_{pose}$ penalizes large deviations of the local body pose $\hat{\theta}_t$ from the HybrIK predictions, $E_\beta$ is prior over body shapes, and $E_{VAE}$ a motion prior loss defined as in Equation 7.

$$E_{VAE} = -\sum_{i}^{N} \log N(z_\Phi^i; \mu_\Phi(\{\Phi_t^i\}), \sigma_\Phi(\{\Phi_t^i\})) + \log N(z_\theta^i; \mu_\theta(\{\theta_t^i\}), \sigma_\theta(\{\theta_t^i\}))$$ Equation 7

The term $E_{contact}$ encourages zero velocities for joints that are predicted to be in contact $\hat{K}_t$ with the ground plane as in Equation 8.

$$E_{contact} = \sum_{i=1}^{N} \sum_{t=s_i}^{e^i} \hat{K}_t^i \|J_t^i - J_{t-1}^i\|^2$$ Equation 8 where $\hat{K}_t^i \in \mathbb{R}^{24}$ is the contact probability output from the motion prior decoder $\mathcal{D}$ for each joint.

$E_{height}$ prevents in-contact joints from being far away from the ground plane, per Equation 9.

$$E_{height} = \hat{K}_t^i \max(|J_t^i| - \delta, 0)$$ Equation 9

The ground plane is kept fixed and assumed to be xy-plane aligned with +z-axis as the up direction. This parameterization allows all variables to be optimized in this consistent coordinate frame without the need to optimize an additional ground plane equation.

The error term $E_{camera}$ in Equation 4 ensures that the reconstructed camera motion is smooth and consistent with the static scene motion. Since DROID-SLAM is trained on videos with static scenes only, its estimates can be noisy due to the dynamic humans present in target videos. Hence, the point cloud recovered by SLAM can be used as a direct constraint in the optimization, instead of directly relying on the camera predictions. To ensure that the points on dynamic humans do not influence camera reconstruction, all points that lie inside the person bounding boxes may be removed. The term $E_{PCL}$ then computes the re-projection error of the pruned point cloud similar to Equation 5. The term $E_{smooth}^b$ ensures that the optimized parameters are temporally smooth. The weights of different error terms in the objective may be empirically chosen.

Parallel Motion Optimization

The specific choice of human motion prior mentioned above (i.e. NeMF) allows a parallel motion prior to be designed that is suitable for batch optimization, which significantly enhances the efficiency of the embodiments discussed above. In particularly, the parallel motion prior allows the runtime to grow sublinearly with respect to the sequence length.

Concretely, in one embodiment, a motion sequence is split into overlapping windows of T=128 frames. 16 overlapping frames are used to help reduce jitter and discontinuities across windows. Dividing motions into overlapping windows also allows the latent codes of the prior to model a fixed length of motion. Since the motion prior is non-autoregressive, all windows can be optimized in parallel. To ensure smooth transitions between clips, a batch consistency term $E_{consist}$ is also computed, defined as the $l_2$ distance between 3D joints $J_t^i$ of overlapping frames.

Multi-Stage Optimization

The task of reasoning about the camera and human motion from a video is inherently ill-posed, as optimizing both camera motion $R_t$, $T_t$ and motion prior latent codes $\{z_\Phi, z_\theta @\}$ simultaneously can result in local minima. To address this challenge, a multistage optimization pipeline is adopted, with different parameters optimized in different stages to avoid bad minima. After obtaining initial camera motion results from SLAM and human motion results from the motion prior, the optimization process is carried out in four stages, as outlined in Table 1.

TABLE 1

| Stages | Opt. Variables | Loss Functions | Description |
|---|---|---|---|
| Stage-1 | s, $h_0$, $R_0$, $\beta$ | $E_{2D} + E_\beta$ | camera traj. transform |
| Stage-2 | s, $h_0$, $R_0$, $\beta$, $z_\Phi$ | $E_{body} + E_{scene}$ | +global human orientation |
| Stage-3 | s, $h_0$, $R_0$, $\beta$, $z_\Phi$, $z_\phi$ | $E_{body} + E_{scene}$ | +local body pose |
| Stage-4 | $\beta$, $z_\Phi$, $z_\phi$, $R_t$, $T_t$ | $E_{body} + E_{scene} + E_{camera}$ | +full camera trajectory |

In Stage-1, only the first frame camera parameters ($R_0$, $h_0$), camera scale s, and the subjects' body shape ft are optimized based on the initial camera and human motion. In Stage-2, the global orientation latent code zip is incorporated to jointly adjust the subjects' global orientation and camera. In Stage-3, the local body motion zo is optimized as well. Finally, in Stage-4, optimize the full camera trajectory is jointly optimized along with $z_\Phi$, and $z_\theta$. Each stage is run for 500 steps.

Occlusion Handling

The embodiments described herein offer a natural solution for occlusions due to subjects in the scene. This is achieved by excluding error terms for occluded frames during optimization and solely optimizing the latent codes $\{z_\Phi, z_\theta\}$ for visible frames. After optimization, motions are sampled from the motion prior to infill the missing poses which will be consistent with their visible neighbors.

Figure 5:
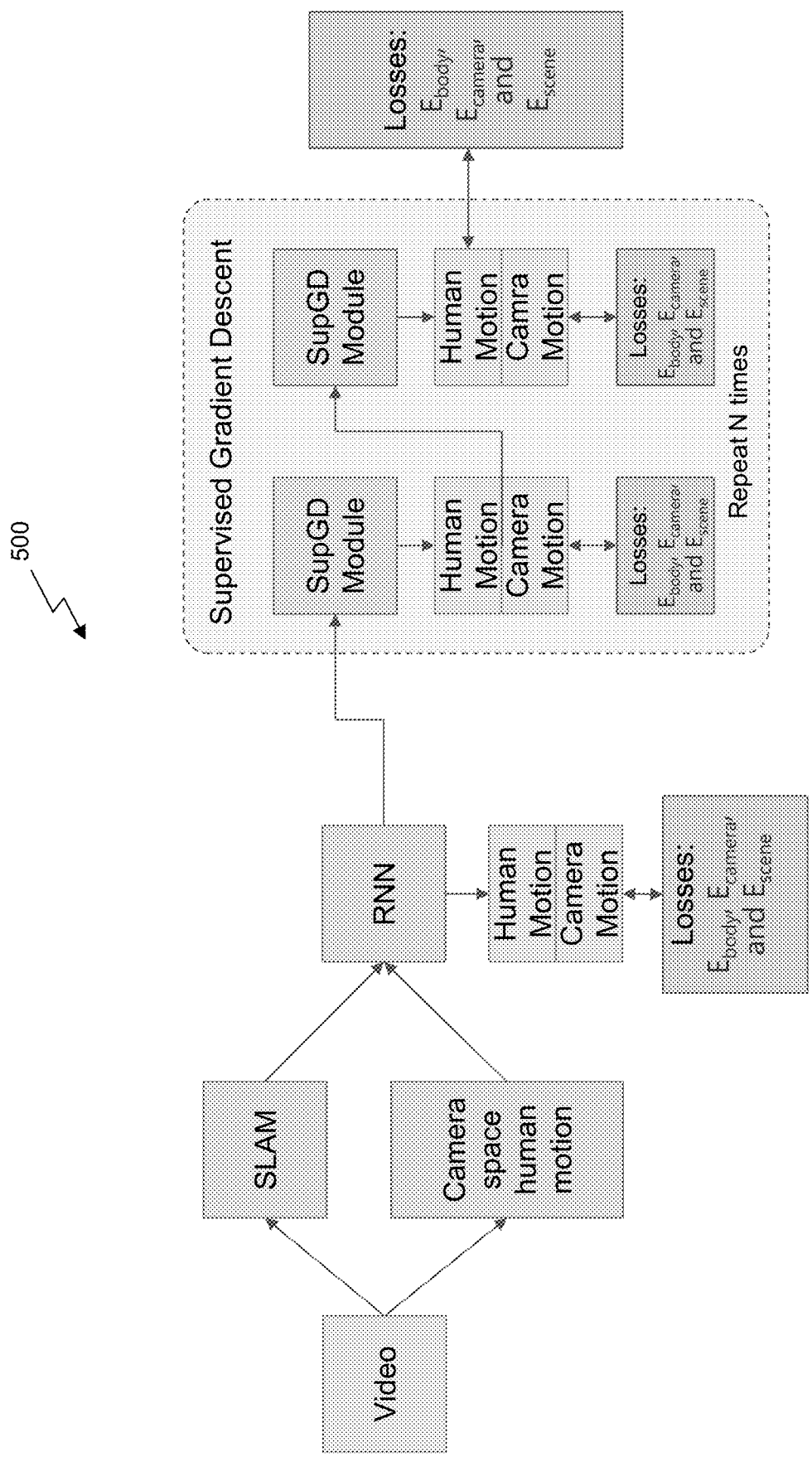
FIG. 5 illustrates a flow diagram of a system that uses supervised gradient descent to refine an initial estimation of camera and articulated object motion, in accordance with an embodiment.

FIG. 5 illustrates a flow diagram of a system 500 that uses supervised gradient descent to refine an initial estimation of camera and articulated object motion, in accordance with an embodiment.

As illustrated, the system 500 takes a video as input. A SLAM method provides initial camera localization results and a pose estimation method provides camera space human motion. A recurrent neural network (RNN) module predicts the initial global human and camera motion. Then, in the present embodiment, supervised gradient descent is used to refine results taking various losses into account as shown. This allows the model to adapt during test time.

Figure 6:
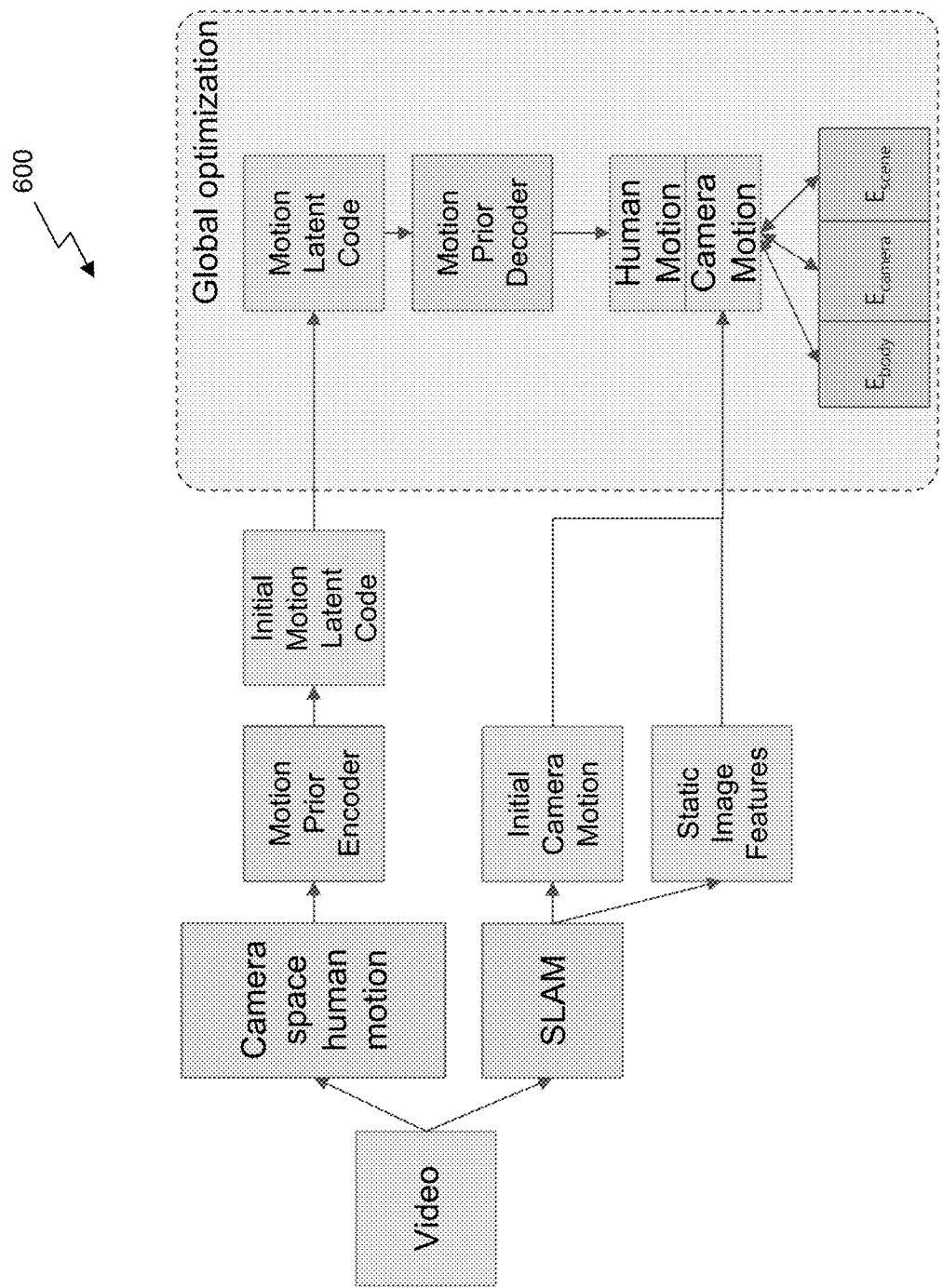
FIG. 6 illustrates a flow diagram of a system that uses global optimizations to refine an initial estimation of camera and articulated object motion, in accordance with an embodiment.

FIG. 6 illustrates a flow diagram of a system 600 that uses global optimizations to refine an initial estimation of camera and articulated object motion, in accordance with an embodiment.

As illustrated, the system 600 takes a video as input. A SLAM method provides initial camera localization results and static image features. A pose estimation method provides camera space human motion. A motion prior trained on a large motion capture dataset is used to encode the camera space human motion to a motion latent code. In the global optimization step, this motion latent code and the initial camera motion are optimized together to minimize 2D reprojection loss, contact consistency losses, motion prior losses, among other losses as shown.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 715 for a deep learning or neural learning system are provided below in conjunction with FIGS. 7A and/or 7B.

In at least one embodiment, inference and/or training logic 715 may include, without limitation, a data storage 701 to store forward and/or output weight and/or input/output data corresponding to neurons or layers of a neural network trained and/or used for inferencing in aspects of one or more embodiments. In at least one embodiment data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 701 may be included with other on-chip or off-chip data storage, including a processor's L1, L2, or L3 cache or system memory.

In at least one embodiment, any portion of data storage 701 may be internal or external to one or more processors or other hardware logic devices or circuits. In at least one embodiment, data storage 701 may be cache memory, dynamic randomly addressable memory ("DRAM"), static randomly addressable memory ("SRAM"), non-volatile memory (e.g., Flash memory), or other storage. In at least one embodiment, choice of whether data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a data storage 705 to store backward and/or output weight and/or input/output data corresponding to neurons or layers of a neural network trained and/or used for inferencing in aspects of one or more embodiments. In at least one embodiment, data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 705 may be included with other on-chip or off-chip data storage, including a processor's L1, L2, or L3 cache or system memory. In at least one embodiment, any portion of data storage 705 may be internal or external to on one or more processors or other hardware logic devices or circuits. In at least one embodiment, data storage 705 may be cache memory, DRAM, SRAM, non-volatile memory (e.g., Flash memory), or other storage. In at least one embodiment, choice of whether data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 701 and data storage 705 may be separate storage structures. In at least one embodiment, data storage 701 and data storage 705 may be same storage structure. In at least one embodiment, data storage 701 and data storage 705 may be partially same storage structure and partially separate storage structures. In at least one embodiment, any portion of data storage 701 and data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710 to perform logical and/or mathematical operations based, at least in part on, or indicated by, training and/or inference code, result of which may result in activations (e.g., output values from layers or neurons within a neural network) stored in an activation storage 720 that are functions of input/output and/or weight parameter data stored in data storage 701 and/or data storage 705. In at least one embodiment, activations stored in activation storage 720 are generated according to linear algebraic and or matrix-based mathematics performed by ALU(s) 710 in response to performing instructions or other code, wherein weight values stored in data storage 705 and/or data 701 are used as operands along with other values, such as bias values, gradient information, momentum values, or other parameters or hyperparameters, any or all of which may be stored in data storage 705 or data storage 701 or another storage on or off-chip. In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 701, data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7A:
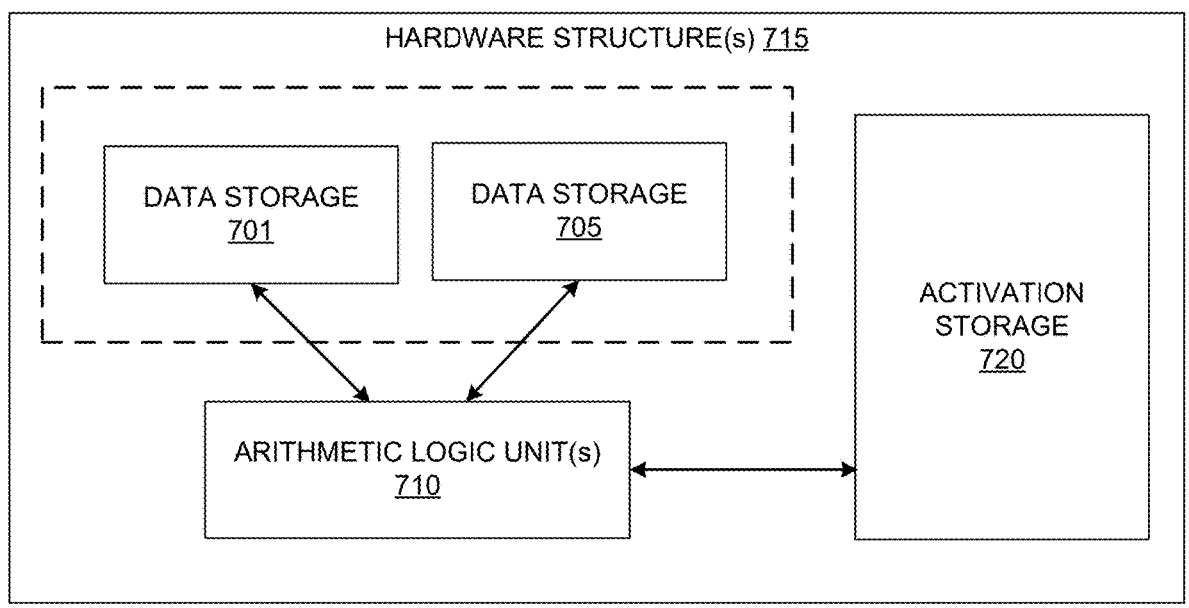
FIG. 7A illustrates inference and/or training logic, according to at least one embodiment.
Figure 7B:
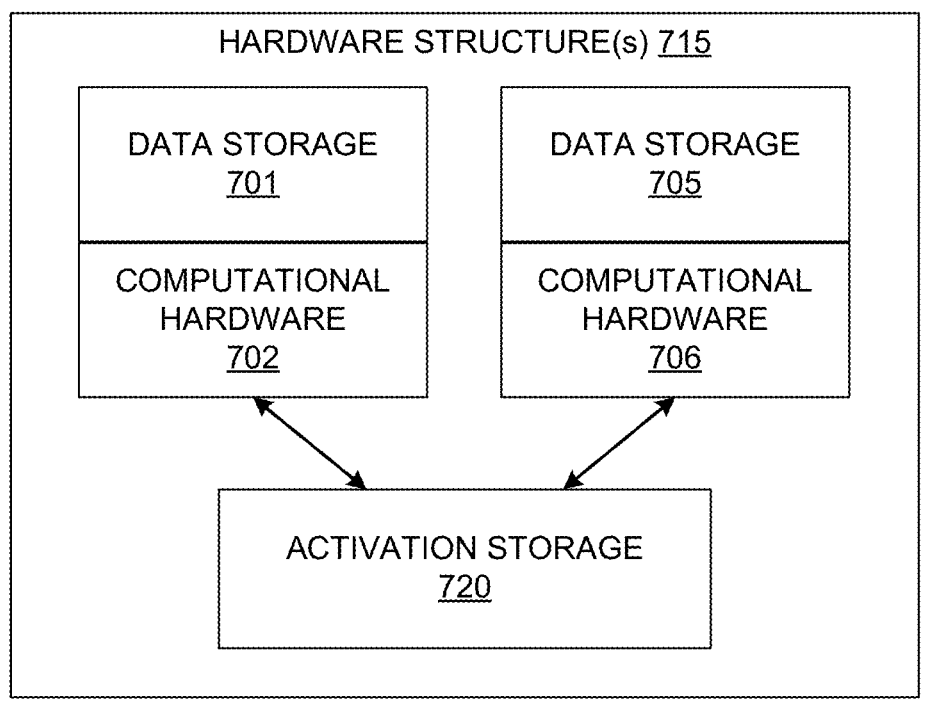
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, data storage 701 and data storage 705, which may be used to store weight values and/or other information, including bias values, gradient information, momentum values, and/or other parameter or hyperparameter information. In at least one embodiment illustrated in FIG. 7B, each of data storage 701 and data storage 705 is associated with a dedicated computational resource, such as computational hardware 702 and computational hardware 706, respectively. In at least one embodiment, each of computational hardware 706 comprises one or more ALUs that perform mathematical functions, such as linear algebraic functions, only on information stored in data storage 701 and data storage 705, respectively, result of which is stored in activation storage 720.

In at least one embodiment, each of data storage 701 and 705 and corresponding computational hardware 702 and 706, respectively, correspond to different layers of a neural network, such that resulting activation from one "storage/computational pair 701/702" of data storage 701 and computational hardware 702 is provided as an input to next "storage/computational pair 705/706" of data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Neural Network Training and Deployment

Figure 8:
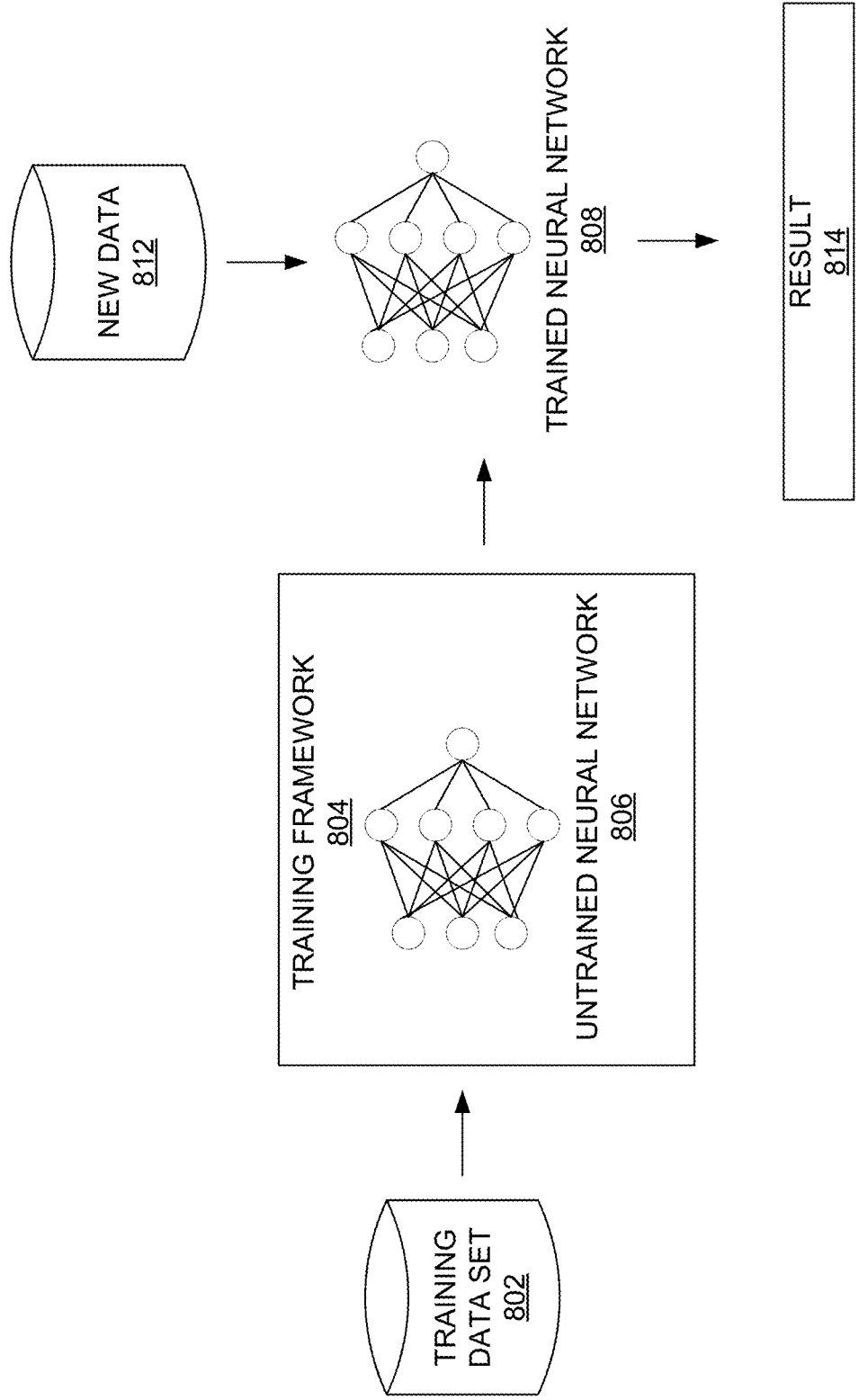
FIG. 8 illustrates training and deployment of a neural network, according to at least one embodiment.

FIG. 8 illustrates another embodiment for training and deployment of a deep neural network. In at least one embodiment, untrained neural network 806 is trained using a training dataset 802. In at least one embodiment, training framework 804 is a PyTorch framework, whereas in other embodiments, training framework 804 is a Tensorflow, Boost, Caffe, Microsoft Cognitive Toolkit/CNTK, MXNet, Chainer, Keras, Deeplearning4j, or other training framework. In at least one embodiment training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having known output and the output of the neural network is manually graded. In at least one embodiment, untrained neural network 806 is trained in a supervised manner processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on known input data, such as new data 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map, which is a type of trained neural network 808 capable of performing operations useful in reducing dimensionality of new data 812. In at least one embodiment, unsupervised training can also be used to perform anomaly detection, which allows identification of data points in a new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new data 812 without forgetting knowledge instilled within network during initial training.

Data Center

Figure 9:
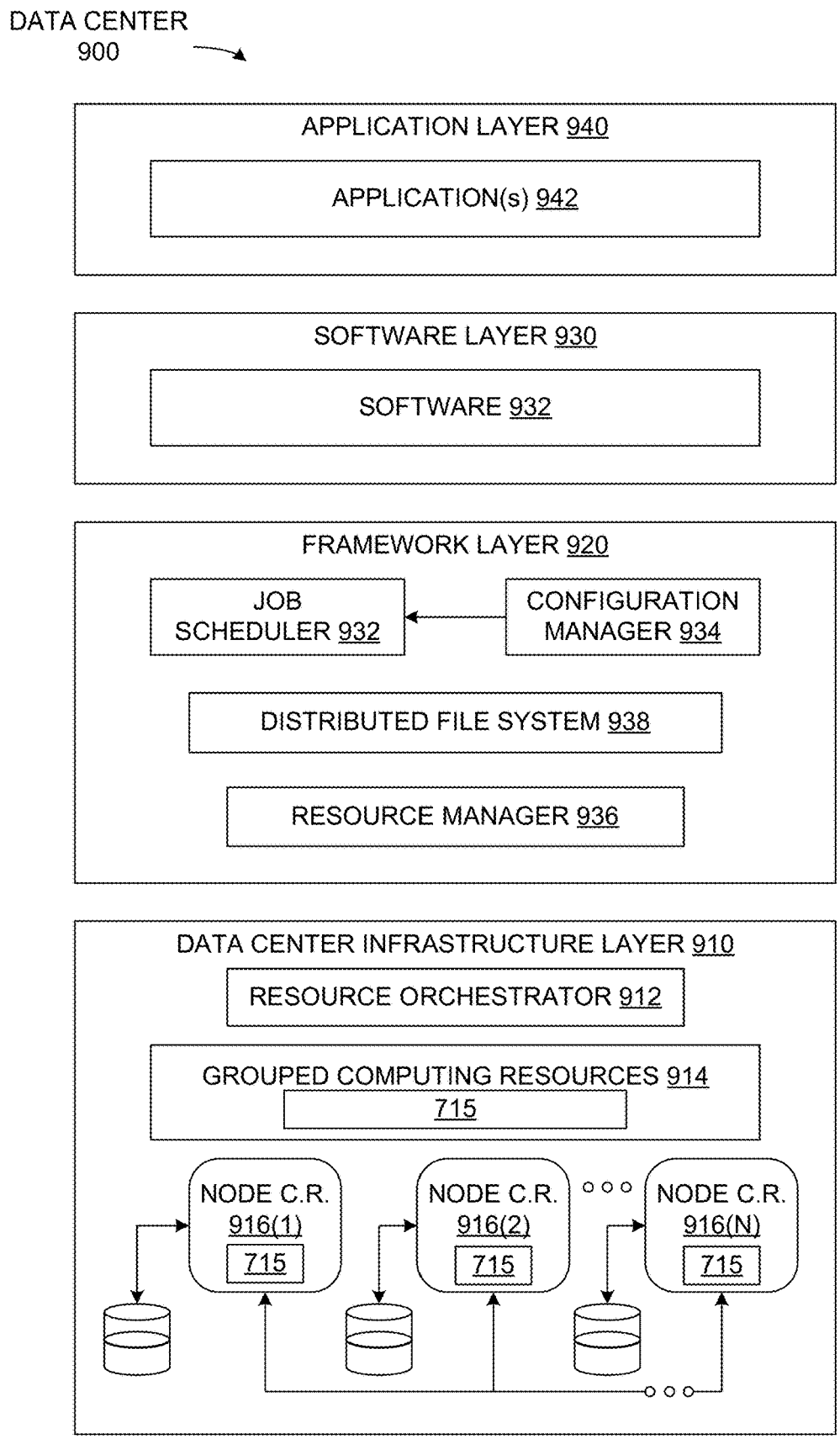
FIG. 9 illustrates an example data center system, according to at least one embodiment.

FIG. 9 illustrates an example data center 900, in which at least one embodiment may be used. In at least one embodiment, data center 900 includes a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

As described herein, a method, computer readable medium, and system are disclosed for collision detection for object rearrangement using a 3D scene representation. In accordance with FIGS. 1-6, embodiments may provide machine learning models usable for performing inferencing operations and for providing inferenced data. The machine learning models may be is stored (partially or wholly) in one or both of data storage 701 and 705 in inference and/or training logic 715 as depicted in FIGS. 7A and 7B. Training and deployment of the machine learning models may be performed as depicted in FIG. 8 and described herein. Distribution of the machine learning models may be performed using one or more servers in a data center 900 as depicted in FIG. 9 and described herein.

What is claimed is:

1. A method, comprising:
at a device:
processing a video captured by a camera to jointly estimate motion of the camera and motion of one or more articulated objects captured in the video, the processing including:
computing an initial estimate of camera motion in a world coordinate frame by estimating, for each frame of a plurality of frames of the video, a camera-to-world transform using information of a static scene captured by the video, the camera-to-world transform including a camera rotation in the world coordinate frame and a camera translation in the world coordinate frame,
computing an initial estimate of articulated object motion in the world coordinate frame for each articulated object of the one or more articulated objects by estimating, for each frame of the plurality of frames of the video, articulated object pose information for the articulated object, wherein at least a portion of the articulated object pose information is estimated in the world coordinate frame using the camera-to-world transform estimated for the frame, and
jointly refining the initial estimate of the camera motion and the initial estimate of the articulated object motion computed for each articulated object of the one or more articulated objects, using an optimization function, to estimate the motion of the camera and the motion of the one or more articulated objects captured in the video; and
outputting the motion of the camera and the motion of the one or more articulated objects captured in the video.

2. The method of claim 1, wherein the video is captured by a moving camera.

3. The method of claim 1, wherein the one or more articulated objects include humans.

4. The method of claim 1, wherein the video is processed using a neural network.

5. The method of claim 1, wherein the articulated object pose information includes:
camera motion dependent object pose information that includes:
global translation,
global orientation, and
object pose parameters; and
camera motion agnostic object pose information that includes:
object shape parameters.

6. The method of claim 1, wherein computing the initial estimate of articulated object motion in the world coordinate frame for each articulated object of the one or more articulated objects includes:
obtaining bounding box sequences for visible articulated objects in the video.

7. The method of claim 6, wherein computing the initial estimate of articulated object motion in the world coordinate frame for each articulated object of the one or more articulated objects further includes:
estimating the articulated object pose information for each detected bounding box in one of the bounding box sequences obtained for the articulated object.

8. The method of claim 1, wherein a subset of the articulated object pose information is agnostic to camera motion and includes:
object pose parameters, and
object shape parameters.

9. The method of claim 8, wherein the object shape parameters are determined as an average of per-frame object shape parameter estimates.

10. The method of claim 1, wherein a subset of the articulated object pose information is dependent on the camera motion and includes:
   global translation, and
   global orientation.

11. The method of claim 10, wherein the global orientation estimated from the camera rotation.

12. The method of claim 11, wherein the global translation is estimated from the global orientation and object pose parameters using a neural network.

13. The method of claim 1, wherein the initial estimate of the camera motion and the initial estimate of the articulated object motion computed for each articulated object of the one or more articulated objects are refined based on an estimation of the scale of camera trajectory.

14. The method of claim 1, wherein the refining is based on human motion priors.

15. The method of claim 1, wherein the refining is based on background scene features.

16. The method of claim 1, where an entirety of the video is divided into sub-clips and all clips are refined in parallel.

17. The method of claim 1, wherein a runtime of the processing grows sublinearly with respect to a sequence length of the video.

18. The method of claim 1, wherein the motion of the camera and the motion of the one or more objects captured in the video are output to a downstream task.

19. The method of claim 18, wherein the downstream task includes a robotics-related task.

20. The method of claim 18, wherein the downstream task includes a mixed reality-related task.

21. A system, comprising:
   a non-transitory memory storage comprising instructions; and
   one or more processors in communication with the memory, wherein the one or more processors execute the instructions to:
   process a video captured by a camera to jointly estimate motion of the camera and motion of one or more articulated objects captured in the video, the processing including:
      computing an initial estimate of camera motion in a world coordinate frame by estimating, for each frame of a plurality of frames of the video, a camera-to-world transform using information of a static scene captured by the video, the camera-to-world transform including a camera rotation in the world coordinate frame and a camera translation in the world coordinate frame,
      computing an initial estimate of articulated object motion in the world coordinate frame for each articulated object of the one or more articulated objects by estimating, for each frame of the plurality of frames of the video, articulated object pose information for the articulated object, wherein at least a portion of the articulated object pose information is estimated in the world coordinate frame using the camera-to-world transform estimated for the frame, and
      jointly refining the initial estimate of the camera motion and the initial estimate of the articulated object motion computed for each articulated object of the one or more articulated objects, using an optimization function, to estimate the motion of the camera and the motion of the one or more articulated objects captured in the video; and
   output the motion of the camera and the motion of the one or more articulated objects captured in the video.

22. A non-transitory computer-readable media storing computer instructions which when executed by one or more processors of a device cause the device to:
   process a video captured by a camera to jointly estimate motion of the camera and motion of one or more articulated objects captured in the video, the processing including:
      computing an initial estimate of camera motion in a world coordinate frame by estimating, for each frame of a plurality of frames of the video, a camera-to-world transform using information of a static scene captured by the video, the camera-to-world transform including a camera rotation in the world coordinate frame and a camera translation in the world coordinate frame,
      computing an initial estimate of articulated object motion in the world coordinate frame for each articulated object of the one or more articulated objects by estimating, for each frame of the plurality of frames of the video, articulated object pose information for the articulated object, wherein at least a portion of the articulated object pose information is estimated in the world coordinate frame using the camera-to-world transform estimated for the frame, and
      jointly refining the initial estimate of the camera motion and the initial estimate of the articulated object motion computed for each articulated object of the one or more articulated objects, using an optimization function, to estimate the motion of the camera and the motion of the one or more articulated objects captured in the video; and
   output the motion of the camera and the motion of the one or more articulated objects captured in the video.

23. The method of claim 1, wherein supervised gradient descent is used to refine the initial estimate of the camera motion and the initial estimate of the articulated object motion computed for each articulated object of the one or more articulated objects.

* * * * *